United States Patent [19]

Juhász

[11] Patent Number: 4,668,392

[45] Date of Patent: May 26, 1987

[54] FILTER PLATE FOR FILTER PRESSES

[75] Inventor: Ádám Juhász, Budapest, Hungary

[73] Assignee: Chemokomplex Vegyipari Gep-Es Berendezes Export-Import Vallalata, Budapest, Hungary

[21] Appl. No.: 703,129

[22] Filed: Feb. 19, 1985

Related U.S. Application Data

[63] Continuation of Ser. No. 353,029, Mar. 1, 1982, abandoned, which is a continuation of Ser. No. 185,677, Sep. 10, 1980, abandoned.

[30] Foreign Application Priority Data

Sep. 10, 1979 [HU] Hungary .............................. JU 299

[51] Int. Cl.$^4$ ............................................. B01D 25/12
[52] U.S. Cl. ................................... 210/227; 100/198; 100/211; 210/230
[58] Field of Search ............... 210/225, 230, 231, 541, 210/224, 227; 100/113, 198, 211

[56] References Cited

U.S. PATENT DOCUMENTS

| 3,503,326 | 3/1970 | Juhasz et al. | 100/211 X |
| 3,926,811 | 12/1975 | Ramsteck | 210/231 |
| 3,957,645 | 5/1976 | Kurita et al. | 210/231 |
| 4,152,186 | 5/1979 | Shibata | 156/123 R |
| 4,166,035 | 8/1979 | Ramsteck | 210/231 |
| 4,207,189 | 6/1980 | Gueunich | 210/227 |

Primary Examiner—Richard V. Fisher
Assistant Examiner—W. Gary Jones
Attorney, Agent, or Firm—Young & Thompson

[57] ABSTRACT

A one-piece filter plate comprises a pair of webs surrounded by a flange, the webs and flange being integral with each other and of one-piece plastic construction. A pressure medium can be introduced between the webs to force them apart to dewater a filter cake that has built up between the outer surfaces of the webs and the corresponding outer surfaces of the next-adjacent filter plates. The filter plate can be made by vulcanizing together two halves along a medial plane of symmetry.

1 Claim, 5 Drawing Figures

FILTER PLATE FOR FILTER PRESSES

This application is a continuation of application Ser. No. 353,029, filed 3/1/82 now abandoned which is a continuation of application Ser. No. 185,677, filed 9/10/80 and now abandoned.

This invention relates to a filter plate for filter presses and more particularly to one made of flexible plastic.

As is known, there are filter plates consisting of a web divided parallel to its surfaces into two walls and of a circumferential flange surrounding this web. On the outer surfaces of the walls, there are spacer means against which a filter means, e.g. a filter cloth is laid. In the operation of the filter press, filter cakes are grown between the filter cloths of two adjacent filter plates. After filtering, the filter plates are spaced apart whereafter the filter cakes drop down between the filter cloths or they can be removed from there.

In the known filter presses, the walls are, because of the needed strength, rigid, and are coupled through flexible, i.e. relatively thin, belts to the flange to enable the walls to move parallel to themselves. This kind of filter press is disclosed e.g. in German Patent No. 2,358,578.

The known type of filter presses is suited only for ejecting the filter cakes after filtering from the filter cloths by displacing the stiff walls. But they are not adapted to press out the liquid content of the filter cakes in the normal way, for this is not rendered possible by the strength of the flexible belts coupling the rigid walls to the flange. Generally, a pressure of 14–50 kg/cm$^2$ is necessary for pressing, in contradiction to the pressure of 0.01 to 0.1 kg/cm$^2$ needed for removing the cake. The pressing pressure exceeds by several orders of magnitude the cake removing pressure. Thus, the thin belts connecting the walls to the flange would be demaged or torn through at once or relatively soon would bulge or protrude under the high pressures needed for pressing. A further difficulty consists—from a standpoint of manufacturing technology—in that a local thinning down of the walls can be obtained only by using extremely complicated forms and technology.

The main object of the present invention is to eliminate the aforesaid inconveniences and to solve the problems accompanying the manufacture and use of filter plates with divided web and more particularly to construct filter plates suitable not only for removing the cakes but for pressing them, too, without the danger of damaging the filter plates or decreasing their operational reliability. The basic idea of the invention derives from the measurement ratio of filter plates of industrial size. The diameter of this kind of filter plates is, as is known, generally about 80 to 200 cm and their movement parallel to themselves is as little as 1 to 2 cm under the effect of operational pressure needed for pressing. Given this, it has been found that movements of this order of magnitude can be borne by walls having a greater thickness/i.e. the proper strength/as well as a flexible material by flexible deformation. Thus, if the rigid walls are connected to the flange without any thin bolts sensitive to the greater pressure, the greater pressure necessary for the pressing can be applied without any risk.

The essence of the invention is in the construction of web walls having so to say equal strength. Thus, the invention differs from a known filter plate consisting of a web divided parallel to its surfaces into two walls and of a circumferential flange as well as of an inlet conducting a pressure agent into a slit delimited by the wall of the web in that the walls reach into the flange with a uniform wall thickness. This makes it possible—in the case of known filter plates with flanges and webs made of one piece—to divide the web parallel to its surface into two walls for forming a pressure chamber and utilize it not only for throwing out the cake but for pressing or dewatering it without the necessity of some kind of stiffener bearing the side load for assuring the proper strength of the web.

The equal displacement of the web can be expedited by a pair of radially outwardly extending bifurcated extensions which enclose an angle with one another. With this technical step, the ability or articulation between the walls and the flange is increased.

In a preferred embodiment, the extensions reach into the flange, because here are borne the greatest loads derived from the articulated movement.

In the web, a slitless area may be left which may be traversed by a transverse passage for letting in the medium to be filtered.

The opposite outer surfaces of the web may be provided with spacer means forming filtrate abducting passages between the surface and the associated filter cloths in a per se known way. This can be achieved by a proper construction of the outer surface of the web. The manufacturing technology is simplified to a great extent by this technical measure.

The filter plate can be put together from two parts which sandwich the slit and in the area of the flange are fixed to one another by way of e.g. vulcanization. This solution makes an extremely simple manufacturing technology possible.

This solution has a great importance in the case of great differences in side pressures, too, wherein a stiffener plate is arranged between the parts for increasing the operational safety of the filter plate. An opening should be provided through the stiffener for conducting the pressure agent in the pressure chamber on both sides of the stiffener.

In the course of filtering, the walls of the filter plate surrounding the slit may lie against one another for increasing the strength of the filter plate against side forces.

In the unloaded condition of the filter plate, a gap may be left between its walls delimiting the slit. This solution renders possible the automatic removing of the cake, for the flexibility of the walls by their displacement is sufficient for ejecting the filter cake between them.

Further details and objects of this invention will be described by reference to the accompanying drawings which show several exemplified embodiments of the filter plate according to the invention, and in which.

The same reference characters refer to similar details throughout the various illustrated embodiments.

Figure 1:
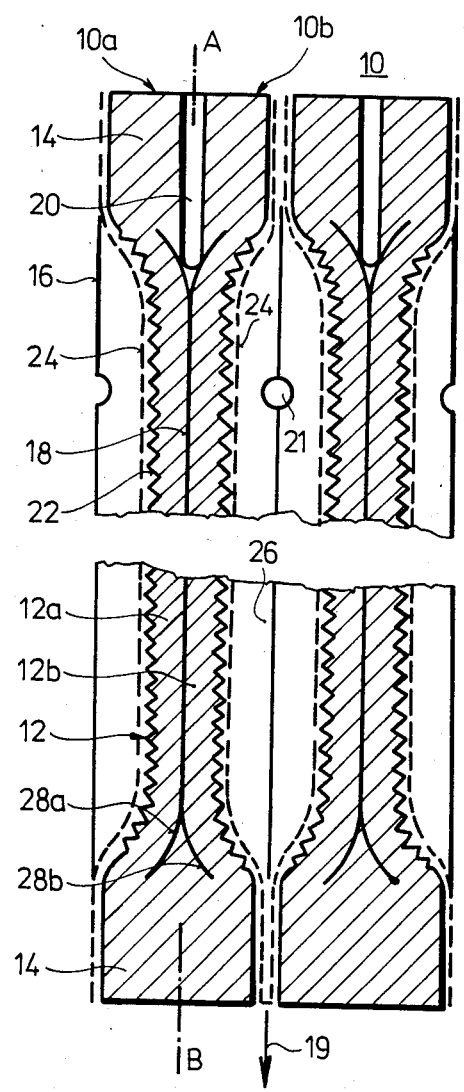
FIG. 1 illustrates a detail of an exemplified embodiment in an intermediate operational position and in longitudinal sectional view.

In the drawings, FIG. 1 shows an exemplified embodiment wherein two filter plates 10 of the same construction are placed together. The filter plate 10 consists of a web 12 and a circumferential flange 14. The web 12 is divided parallel to its surface 16 along a dividing plane A-B, so it consists of two walls 12a, 12b, respectively, by which a slit 18 along the dividing plane A-B is surrounded. The slit 18 is connected to an inlet 20 in the flange 14. The inlet 20 may be coupled to a source of pressure agent not shown in the figure.

The filter plate 10 can be composed of two parts 10a and 10b fixed one another about to the flange 14.

The web 12 is provided on its opposite outer surfaces with spacer means 22, e.g. ribs in a per se known manner against which a filter mens, e.g. filter cloth 24 is laid in a per se known manner as well.

The filter cloths 24 facing one another of two adjacent filter plates 10 surround a cake chamber 26 which is connected to slurry inlet 21 in a per se known way.

With the exemplified embodiment shown in this figure, the slit 18 has a pair of radially outwardly extending bifurcated extensions 28a and 28b spaced apart by a rib 28c integral with flange 14. As is evident from FIG. 1, the opposite sides of rib 28c define the inner side walls of extensions 28a and 28b and are concave with the same curvature as the outer side walls of extensions 28a and 28b, which outer side walls lie against rib 28c in the position of the parts shown in FIG. 1. These extensions enclose an acute angle and preferably reach into the flange 14, the importance of which will be described later.

In the operation of this exemplified embodiment of filter plate according to the invention, the filter plates 10 are compressed by closing means of a non represented filter press. Thereafter a slurry or suspension to be filtered is introduced through inlets 21 under excess pressure into cake chambers 26. The liquid portion of the introduced material to be filtered flows from filtrate abducting passages between web 12 and filter cloth 24 in the direction of arrow 19. After the cake chamber 26 is filled by the solid portion of the introduced slurry or suspension, a pressure agent is introduced through inlet 20 into slit 18. In this way, the two walls 12a and 12b delimiting the slit 18 will be forced away from one another (FIG. 2) and pressure will thus be exerted on cake 30 in cake chamber 26. Upon cake 30 being put under pressure, the liquid portion flows through filter cloth 24 in the direction of arrow 19, thus, cake 30 left in the cake chamber 26 has a relatively low liquid content which drops down or can be removed after opening the filter press or spacing apart the filter plates 10.

It can be seen, the displacement of walls of slit 18 is comparatively uniform as a result of extensions 28a and 28b i.e. they displace parallel to themselves with their entire surface. But during filtering, they lie against one another which is advantageous as imparting to the web 12 a relatively higher strength.

Figure 2:
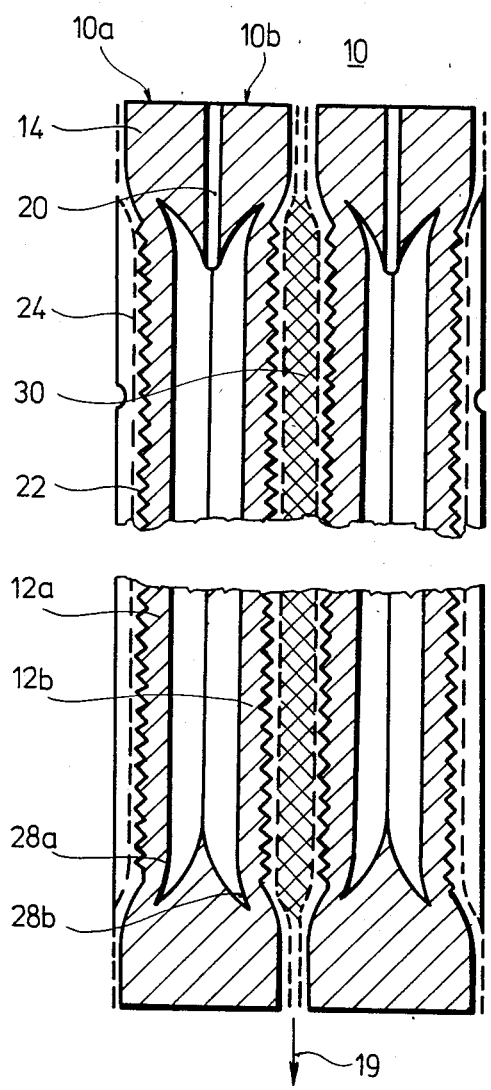
FIG. 2 shows the embodiment of FIG. 1 when pressing a cake.
Figure 3:
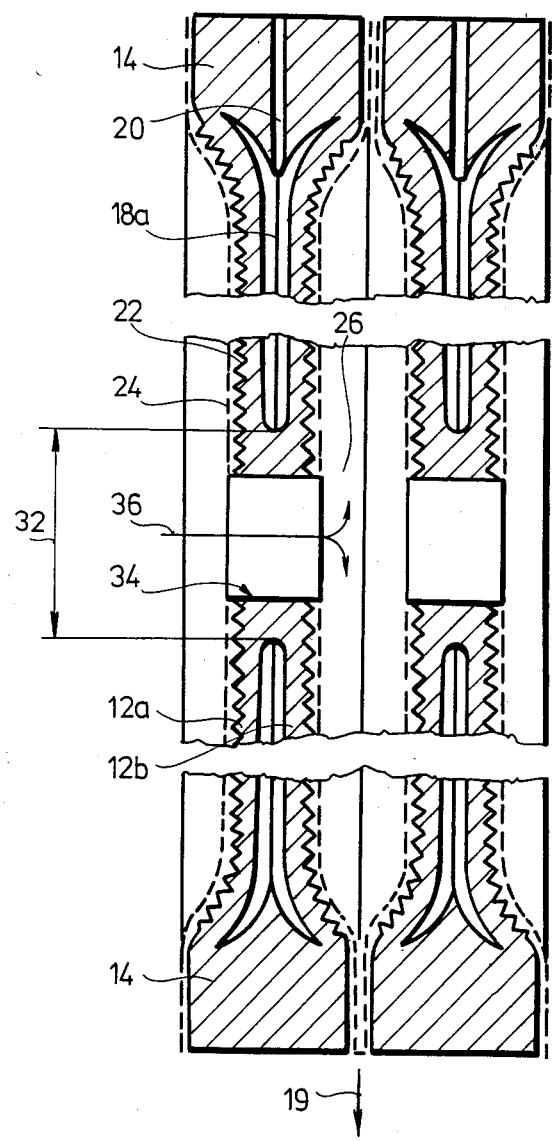
FIGS. 3 and 4 illustrate a detail of another embodiment in two different operational positions and in longitudinal sectional view.
Figure 4:
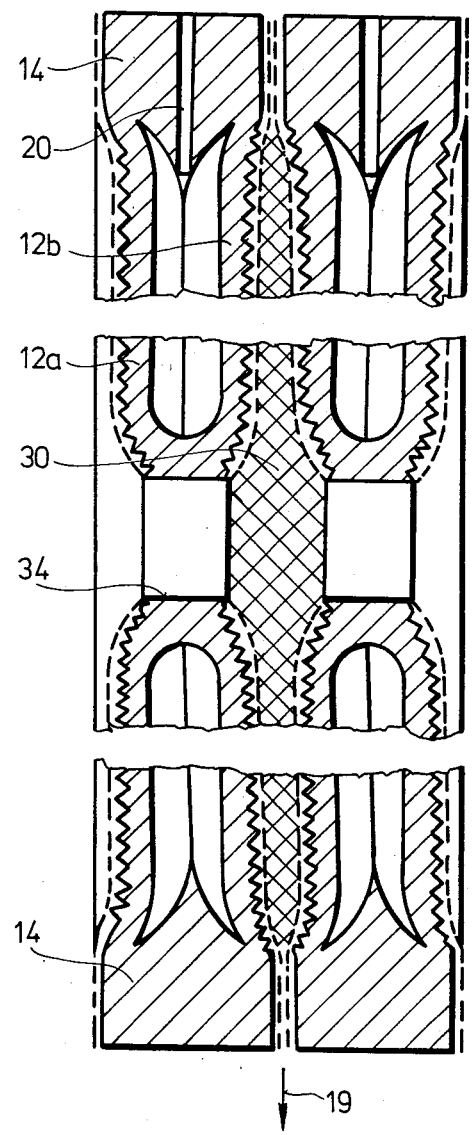

The exemplified embodiment shown in FIGS. 3 and 4 differs from that according to FIGS. 1 and 2 in that the slit 18 has a certain size in the axial direction, too, as a result of which the limiting walls of the slit 18 are separated in unloaded condition of the filter plate by a gap 18a. This gap 18a may be needed, if the cakes 30 are to be removed from filter cloths 24 automatically after opening the filter press. On the other hand, web 12 is provided with a slitless area 32 traversed by a transverse passage 34. The passage 34 has the function of introducing a slurry or suspension as is shown in FIG. 3 by arrows 36.

Figure 5:
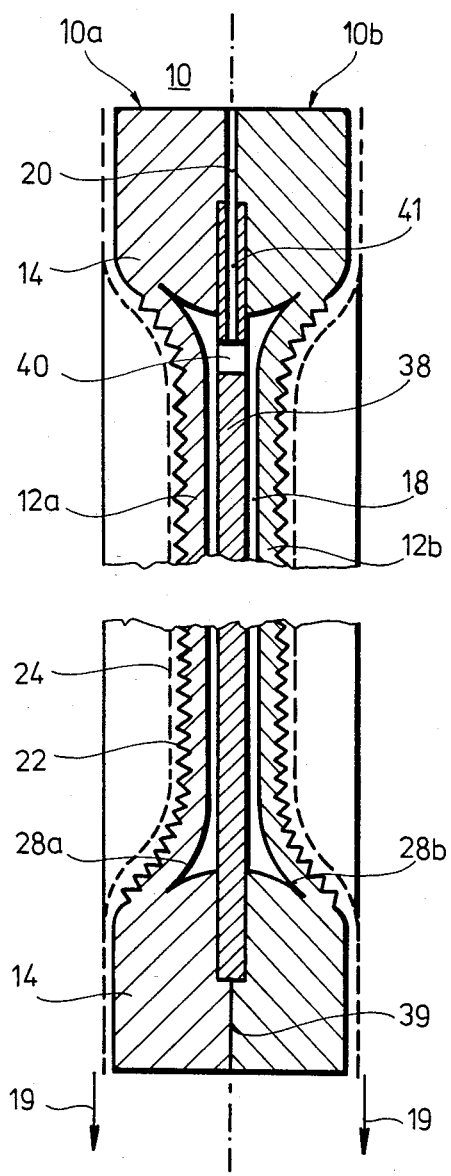
FIG. 5 is still another embodiment of the invention in longitudinal sectional view.

FIG. 5 represents again a filter plate, wherein the filter plate 10 is assembled along dividing plane 39 from two parts 10a and 10b. These are vulcanized one to the other integrally about flange 14. Instead of vulcanization, another fixing method, e.g. screwing can be applied as well. In the slit 18, a stiffener 38 is provided in this embodiment for separating the two walls 12a and 12b. In the stiffener 38 is an opening 40 conducting pressure agents and connected through a passage 41 to inlet 20. More than one opening 41 can be provided.

In unloaded condition, the walls 12a and 12b may lie against one another and be adapted to bear great side forces in this way.

The filter plate 10 can be manufactured in this case by making separately the parts 10a and 10b at first then placing in one of them the stiffener 38. Thereafter, the part provided with stiffener 38 will be covered with the other part and the two parts 10a and 10b vulcanized one to the other about the flange 14.

In this way, a filter plate 10 formed as a compact unit can be obtained which need be provided only with filter cloths 24.

For the sake of desiccating the filter cakes during filtering, a pressure agent is introduced through inlet 20, passage 41 and opening 40 into slit 18. Thereafter, walls 12a and 12b will be spaced apart one from the other and the filter cakes which grow between filter cloths 24 facing one another of two adjacent filter plates 10 will be placed under pressure. The liquid pressed out in this way leaves in the direction of arrows 19 as is described hereinabove. The manner of operation differs almost not at all from that of the previously disclosed embodiment except that after relieving the pressure in slit 18, the walls 12a and 12b can lie against the stiffener 38 under the effect of side forces.

As is mentioned above, the walls 12a and 12b of filter plate 10 not only may lie against one another but also can encircle a gap. As can be seen, either arrangement may be desirable.

I claim:

1. A one-piece filter plate having a web in the form of two walls and a surrounding flange, each of said walls being of one piece with said flange, and means for introducing a fluid under pressure between said walls, the flange having a rib thereon between the walls, the walls adjacent the flange having the same shape as and lying against the sides of the rib when filter cake presses the walls toward each other, said walls extending into the flange with a uniform wall thickness, said filter plate comprising two halves each including one of said walls and half of said flange and rib, integrally secured together along a medial plane, said walls and flange being plastic, and a flat stiffener plate secured between said two halves, margins of the stiffener plate being secured between the flange portions of said halves, said flange portions extending edgewise outwardly beyond said stiffener plate and being vulcanized together edgewise outwardly beyond said stiffener plate, said halves of said rib being disposed against opposite sides of said stiffener plate.

* * * * *